No. 770,082. Patented September 13, 1904.

UNITED STATES PATENT OFFICE.

HEINRICH LINNEKOGEL, OF FEUERBACH, GERMANY.

PLASTIC COMPOSITION FOR COVERING FLOORS.

SPECIFICATION forming part of Letters Patent No. 770,082, dated September 13, 1904.

Application filed November 19, 1903. Serial No. 181,877. (No specimens.)

*To all whom it may concern:*

Be it known that I, HEINRICH LINNEKOGEL, a subject of the Emperor of Germany, residing at Feuerbach, in the Kingdom of Würtemberg, Germany, have invented certain new and useful Improvements in Plastic Compositions for Covering Floors, of which the following is a specification.

My invention relates to the preparation of a plastic composition for covering floors, and has for its object the production of a composition of this kind which may be applied either directly to the floor or to a supporting medium or fabric, which will dry quickly and will form a hard smooth surface which will be waterproof and easily cleaned.

In carrying out my invention I take casein, crushed gallnut waste of the sort which is obtained in the manufacture of tannic acid, and the required pigment and mix them thoroughly in a dry state. Cold water is then added in sufficient quantity to form a paste, with which is mixed animal or vegetable fiber. The mixture is now allowed to stand for a time, after which a mixture of glycerin and a resinous composition, such as kauri copal dissolved in turpentine, is added to the mixture. While other substances may be used in this connection, I prefer to use kauri copal, as it gives the required elasticity and renders the composition waterproof and has the advantages over other resins that it will not dry so easily when dissolved in oil of turpentine. I prefer to use gallnut waste, as it has about two per cent. acidum tannicum, tannic acid of gallnuts, or tannic $C_{14}H_{10}O_9$. (The gallnuts themselves contain as much as sixty-five per cent. of this acid.) The plastic composition thus prepared may be applied either directly to the floor or to a fabric in any desired manner, as by the use of rollers. After the preparation has become dry, which usually requires about three days, the surface is scraped smooth, polished, and waxed.

When this composition has been properly laid on a floor, it forms a hard smooth surface and fits close to the walls after becoming dry. In the same way vertical walls may be coated with the composition or carpets may be formed by applying it to a supporting fabric.

Having described my invention, what I claim is—

1. A plastic composition for covering floors consisting of a mixture of casein, crushed gallnut waste, pigment, water and animal or vegetable fiber, substantially as described.

2. A composition for covering floors consisting of a plastic mixture of casein, crushed gallnut, pigment, fiber, glycerin and resin, substantially as described.

3. The method of producing plastic compositions for floor-coverings consisting in dry-mixing casein with crushed gallnut waste and a pigment, then adding water to form a paste and mixing animal or vegetable fiber with said paste, substantially as described.

4. The method of producing plastic compositions for floor-coverings, consisting in dry-mixing casein with crushed gallnut and a pigment, then adding water to form a paste, mixing animal or vegetable fiber with said paste, and after allowing the paste to stand for a time adding a mixture of glycerin and a resinous composition, substantially as described.

In testimony that I claim the foregoing as my invention I have signed my name in presence of two subscribing witnesses.

HEINRICH LINNEKOGEL.

Witnesses:
 FIRKOL UNZMEYER,
 EMIL VAIZART.